Patented Sept. 10, 1940

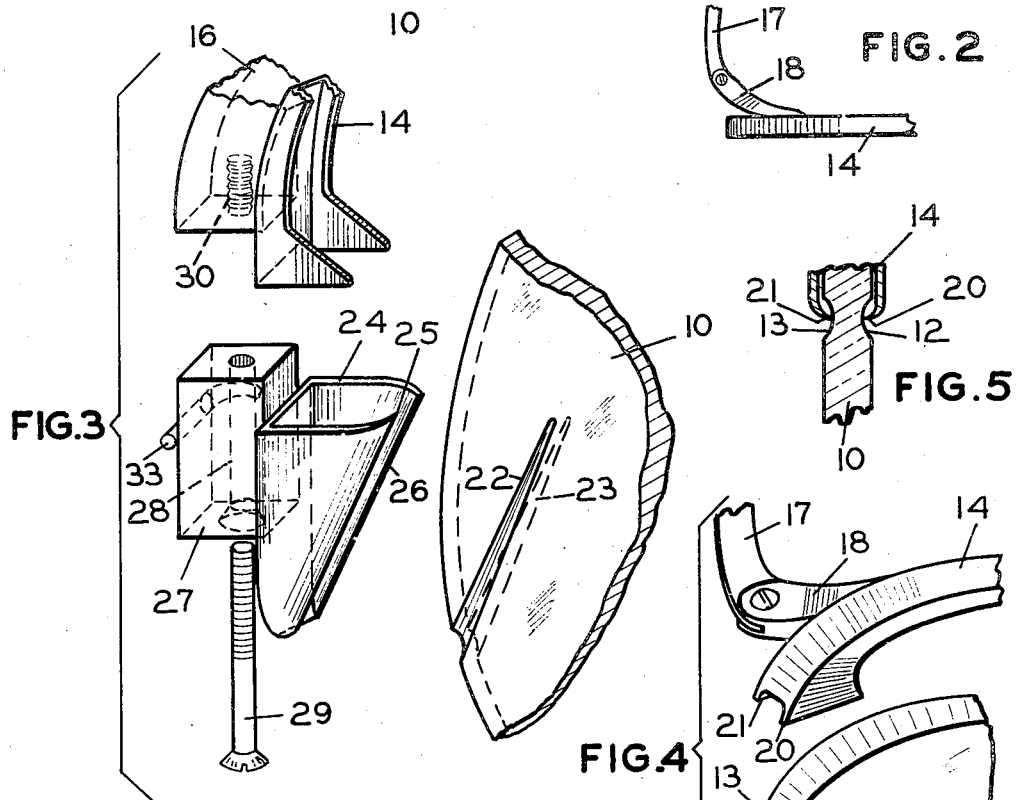

2,214,377

UNITED STATES PATENT OFFICE 2,214,377

OPHTHALMIC MOUNTING

Stanley Markell, Rochester, N. Y., assignor to Bausch & Lomb Optical Company, Rochester, N. Y., a corporation of New York Application April 24, 1939, Serial No. 269,581

4 Claims. (Cl. 88—47)

The present invention relates to ophthalmic mountings and more particularly to a means for anchoring lenses in a semi-rimless mounting.

One of the objects of the present invention is to provide a new and improved ophthalmic mounting. Another object is to provide an improved means for securing lenses in a semi-rimless mounting. A further object is to provide an ophthalmic mounting in which the lens and frame are secured together by complemental cam surfaces. These and other objects and advantages reside in certain novel features of construction, arrangement and combination of parts as will hereinafter be more fully set forth and pointed out in the appended claims.

Referring to the drawing:

Fig. 1 is a front elevation of a pair of spectacles embodying my invention.

Fig. 2 is a fragmentary top plan view thereof.

Fig. 3 is an exploded view of the nasal end of my new mounting.

Fig. 4 is an exploded view of the temporal end of same.

Fig. 5 is a fragmentary section through the lens and mounting.

One embodiment of my invention is illustrated in the drawing wherein 10 designates the two lenses of a pair of spectacles. A pair of parallel grooves or notches 12 and 13 are formed in the opposite surfaces of each lens and extend upward and inward from the temporal edge. These notches or grooves 12 and 13 preferably decrease in depth from the edge inward.

The mounting is of the semi-rimless type and comprises two frame members 14 connected by a bridge 16 which may be soldered or otherwise secured to the frame members. The usual temples 17 are pivotally mounted on arms 18 secured adjacent the temporal ends of the frame members 14.

The frame members 14 are preferably channel-shaped and overlie the top edges of the lenses 10. Adjacent the temple supporting arm 18, the sides of each frame member 14 are bent to form inturned flanges 20 and 21 for engaging in the grooves or notches 12 and 13, respectively, as shown in Fig. 5.

A second pair of parallel grooves or notches 22 and 23 are formed in the opposite surfaces of each lens 10 adjacent the nasal edge and, like the grooves 12 and 13, are inclined upwardly and inwardly from the edge of the lens and decrease in depth inward from the edge. A channel-shaped lug 24 overlies each lens adjacent the grooves 22 and 23 and the sides of each lug 24 are bent to form inward flanges 25 and 26 which engage in the grooves 22 and 23.

A block 27 is secured on each lug 24 by soldering or the like and each block 27 is provided with a hole 28 through which a screw 29 extends. Each screw 29 is threaded into a tapped hole 30 in the adjacent end of the bridge 16. With the frame member and lug in position so that the flanges 20 and 21 engage in the grooves 12 and 13 and the flanges 25 and 26 engage in the grooves 22 and 23, the screw 29 draws the lug and frame member together. The inclination of the grooves and their tapering depth gives them a camming action so that tightening the screw 29 anchors the lens securely in the frame member.

The usual nose pads 32 are suitably secured on arms 33 which may be attached to the blocks 27 as, for example, by soldering or the like.

From the foregoing, it will be apparent that I am able to attain the objects of my invention and provide a semi-rimless ophthalmic mounting which is simple to assemble yet securely anchors the lens in position. Various modifications can, of course, be made without departing from the spirit of my invention or the scope of the appended claims.

I claim:

1. In an ophthalmic mounting a lens having two spaced cam grooves extending inward at an acute angle from the edge of the lens, a frame member overlying the edge of the lens adjacent one of said grooves and extending along the edge of the lens to a point adjacent the other of said grooves, a cam portion on said mounting for engaging in said one of said grooves, a lug overlying the edge of the lens adjacent said other of said grooves, a cam portion on said lug engaging in said other of said grooves, means for drawing said lug and frame member together, and means for securing said lug to the adjacent end of said frame member.

2. In a semi-rimless ophthalmic mounting a lens having grooves extending inward at an acute angle from opposite edges thereof, a frame member extending along the edge of said lens from one groove to the other, said frame member having a channel portion with inturned flanges engaging in one of said grooves, a channel member having inturned flanges engaging in the other of said grooves and screw means for drawing said members together to seat the flanges securely in said grooves.

3. In an ophthalmic mounting, a lens having a groove in one surface extending inward at an acute angle from the edge, and having a second groove in one surface, spaced from the first groove and extending inward at an acute angle from the edge, said grooves converging toward each other at an angle, a frame having a portion overlying the edge of the lens adjacent one of said grooves, an inturned flange on said portion engaging in said one of said grooves, said frame extending along the edge of said lens toward the other of said grooves, a lug overlying the edge of said lens adjacent the other of said grooves, an inturned flange on said lug engaging in said other of said grooves and means for securing said lug to said frame.

4. In an ophthalmic mounting a lens having a groove adjacent the edge and extending along one surface of said lens at an acute angle to the edge, said lens having a second groove spaced from the first groove extending along one surface of the lens and inclined toward the first groove, a frame having a portion overlying the edge of said lens adjacent one of said grooves, an inward flange on said portion engaging in said one of said grooves, said frame extending along the edge of the lens to a point adjacent the other of said grooves, a lug overlying the edge of said lens adjacent said other of said grooves, an inward flange on said lug engaging in said other of said grooves, means for drawing said frame and said lug together, and means for securing said frame to said lug.

STANLEY MARKELL.